United States Patent

[11] 3,599,168

| [72] | Inventor | Gordon L. Long<br>Bloomington, Ill. |
|---|---|---|
| [21] | Appl. No. | 888,778 |
| [22] | Filed | Dec. 29, 1969 |
| [45] | Patented | Aug. 10, 1971 |
| [73] | Assignee | Osborn Engineering Corporation |

[54] HANDLE ASSEMBLY FOR ELECTRICAL FISHING MOTORS
4 Claims, 4 Drawing Figs.

| [52] | U.S. Cl. | 339/58, 115/18 E, 339/108 R |
|---|---|---|
| [51] | Int. Cl. | H01r 15/10 |
| [50] | Field of Search | 339/58, 108; 115/18 E |

[56] References Cited
UNITED STATES PATENTS

| 570,613 | 11/1896 | Smith | 115/18 E |
|---|---|---|---|
| 2,877,733 | 3/1959 | Harris | 115/18 E |

Primary Examiner—Ian A. Calvert
Assistant Examiner—Joseph H. McGlynn
Attorney—Mann, Brown, McWilliams & Bradway ABSTRACT: A tubular control handle for electric outboard fishing motors with an electrical outlet socket press fitted within the handle. The socket is tubular with the electrical parts recessed within the handle. The tubular handle is received within a bore in a housing of the assembly and held by a setscrew which provides a ground connection for the electrical elements.

PATENTED AUG 10 1971

3,599,168

INVENTOR
GORDON L. LONG

BY
Mann, Brown, McWilliams + Bradway
ATTORNEYS

HANDLE ASSEMBLY FOR ELECTRICAL FISHING MOTORS

The present invention is directed to new and useful improvements in battery driven electric outboard fishing motors and is particularly concerned with improvements in control handle assemblies therefor.

The major purposes of the present invention are to form a control and manipulating handle assembly for electric outboard fishing motors in a simplified manner which allows use of the handle as an electrical outlet for various accessories; to so form an electrical outlet in such handles that it protects the user against shock while being readily accessible and protected against the weather; and to form the handle in such a manner as to allow simple and quick assembly of the various component parts of the assembly.

These and other purposes will become more apparent in the course of the ensuing specification and claims when taken with the accompany drawings, in which:

Like elements are designated by like characters throughout the specification and drawings.

Figure 1:
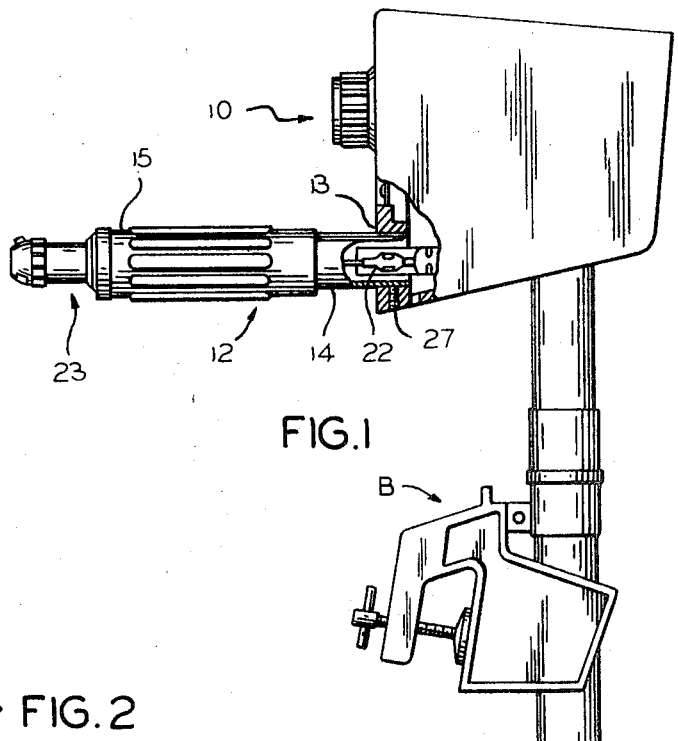
FIG. 1 is a side view with certain parts in section illustrating an electric outboard fishing motor provided with the present invention.
Figure 2:
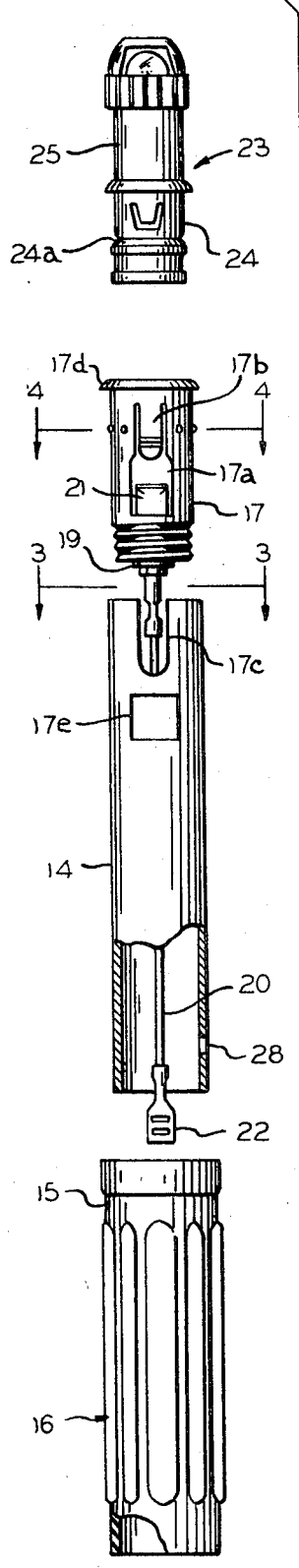
FIG. 2 is an exploded view illustrating certain parts of the invention shown in FIG. 1.
Figure 3:
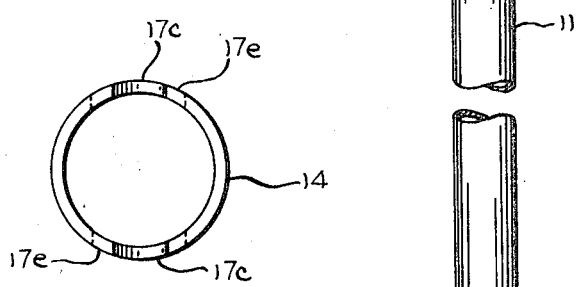
FIG. 3 is a sectional view of a housing illustrated in FIGS. 1 and 2.

With specific reference now to the drawings, and in the first instance to FIG. 1, the numeral 10 generally designates a control housing for an electric outboard fishing motor. The housing has a shaft 11 depending therefrom, which shaft is adapted to support a propeller. In some motors of this type, an electric motor M is carried at the lower end of the shaft, whereas in other cases the motor may be mounted within the housing 10 and connected through suitable shafting to the propeller. Housing 10 is adapted to be swively mounted on a boat by means of a clamping bracket assembly B so that the housing and shaft may rotate about the axis of the shaft and thus change the direction of thrust of the propeller. The electric drive motor for the propeller is connected through suitable terminals to a source of DC power such as a storage battery (not shown). The housing 10 may carry a rheostat for varying the voltage applied to the DC motor and thus enable control of the speed of the motor. The housing and shaft are adapted to be rotated about the axis of the shaft by means of a control handle assembly 12 which embodies the present invention and which will be described in detail hereinafter.

Electric outboard fishing motors, as thus generally described, are known to the art. The housing may have the general shape illustrated or may have other shapes known to the art.

In accordance with the present invention, housing 10 has a bore 13 with its axis extending generally transversely to the axis of the shaft 11. Bore 13 is adapted to receive one end of an elongated open-ended support tube 14. This end of the tube has a sliding fit with the bore. The tube 14 defines the main body of the handle. The exterior of this tube 14 may be provided with means to enhance frictional gripping thereof which, as illustrated, is in the form of a plastic sleeve 15 having ribs 16 in the exterior surface thereof.

Tube 14 acts as a retainer for an electric socket tube 17 which is received within the other end (outer end) of the tube. Socket tube 17 includes outwardly extending dimples or projections 18 pressed into the wall thereof whereby the socket tube may have a press-fitting relation with the tube 14 by reason of the forced, frictional engagement of the dimples with the interior wall of the tube 14.

Socket tube 17 also includes diametrically spaced slots 17a in the wall thereof with fingers 17b extended within the slots and formed from the wall of the tube. Support tube 14 has diametrically spaced cutout recesses 17c in the wall thereof and extending from the outer end of the tube inwardly for a distance sufficient to accommodate the fingers 17b and allow outward expansion of the fingers. Tube 17 has an end rim 17d which abuts against the end of tube 14 to limit inward movement of the tube 17 within tube 14.

Figure 4:
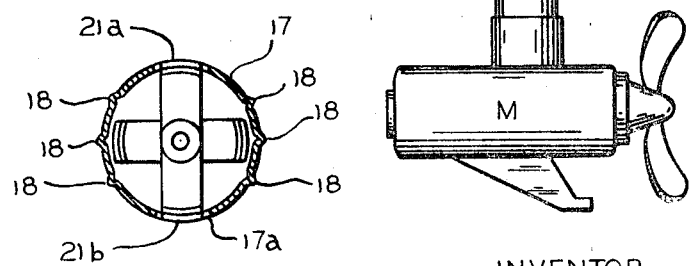
FIG. 4 is a sectional view of a socket illustrated in FIGS. 1 and 2.

The socket tube 17 is formed with an inner end 18 which carries a ceramic insulating plug 19 through which a lead wire 20 extends to a contact element 21 within the inner end of the socket tube. Lead wire 20 extends through the tube 14 to a point of connection through a terminal 22 with one terminal of the storage battery, as, for example, the positive terminal of the battery. The electrical connections of the socket tube may be made in the conventional manner of automotive cigar lighters. As will be noted in FIG. 4, the contact member 21 includes outwardly extending projections 21a and 21b. The projections 21a and 21b may thus be connected to a tubular male plug of an electrical appliance to establish an electrical connection through one side of the appliance. For example, the appliance may take the form of a cigarette lighter designated at 23 which is formed with a conventional outer support shell 24, and an inner shell 25 slidably received within the outer shell. The inner shell may have a heater coil on the end thereof. When the lighter element is inserted all the way into the socket tube 17, a part carried by the inner shell may contact the extensions 21a and 21b so that a positive connection is established to the end of the heater coil which is connected to this part. The projections 21a and 21b may include outer portions which underlie the cutouts 17a and which are adapted to embrace the inner end of an inner shell part in a snap fitting relation when this part is in contact with the elements 21a and 21b. The other end of the heater coil is connected through a part in the inner shell to the outer shell 24. Since the outer shell 24 is in contact with the socket tube 17, and since the wall of the socket tube is in electrical contact with the tube 14, the other side of the circuit, as for example the ground connection, is established through the tube 14. The type of electrical connection made by socket tube 17 and the lighter element 23 is known to the art.

The outer shell 24 is adapted to be held in place in the socket tube by the fingers 17b. When these fingers embrace and grip a groove 24a in the lighter 23 they are expanded outwardly into the recesses 17c. Tube 14 may also have cutout portions 17e which are aligned with the contact making parts 21a and 21b to prevent electrical contact between these parts and the tube 14. Tube 14 is conveniently held within the bore 13 by means of a setscrew 27 carried by the housing and extensible within the bore 13. Setscrew 27, when extended into the wall of the bore, as by rotating the same, engages within an aperture 28 in the tube 14 and completes the ground contact of the electrical circuit in this manner.

The electrical appliance utilized with the assembly may take the form of a combined cigarette lighter and lamp as illustrated in the drawings, or may take the form of a plug connectable to a pump or fan, spotlight, or other electrical accessory. In all cases, the plug of the accessory makes the electrical connection by connecting a part of the inner shell thereof to the extensions 21a and 21b while the outer support shell completes the ground connection through the socket tube and the tubular handle 14.

Handle assemblies as thus defined are easily formed from tubular stock. The electrical elements are easily assembled by sliding the socket tube 17 in the outer end of the handle tube 14, whereupon the socket tube is held in position. The electrical lead 20 is extended through the tube and connected to the battery contact. The handle assembly as a whole is securely held by the bore of the housing by the setscrew 27 which both holds the handle in position and establishes the ground connection for the assembly. By locating the socket element within the handle and the electrical contacts therefor at the inner end of the socket tube, the electrical connections are adequately protected from rain or spray since the handle extends generally horizontally in normal use. The outer open end of the socket member is normally closed by the male electrical plug accessory utilized with the assembly as, for example, a combined cigarette lighter and light as illustrated.

I claim:

1. An electric outboard fishing motor assembly including a control housing of the type having a depending propeller-carrying shaft and a propeller adapted to be driven be a source of electric power, an elongated open-ended metal tube having one end supported on said housing with its axis generally transverse to the axis of said shaft, gripping means on the exterior wall of said tube to provide a manipulating handle for said housing, an electrical outlet socket tube received within the other end of said metal tube and having an access opening facing outwardly from the other end of said tube, means for holding said socket tube within said first-named tube, said socket tube including a first electrical connection extending through the interior of said tube and formed and adapted for connection to a source of battery power within said housing, said socket tube including means defining a ground connection with the wall of said first tube, and means carried by said housing and in contact with said first-named tube to complete said ground connection.

2. The structure of claim 1 wherein said socket tube includes projections adapted to define a press-fitting frictional grip with the interior wall of said first tube.

3. The structure of claim 1 wherein said one end of said metal tube is received in a bore in said housing and said means carried by said housing includes a holding setscrew received within a recess in said first end of said tube.

4. The structure of claim 1 wherein said tubular socket is formed and adapted to receive a tubular electrical plug connector of the cigarette lighter type.